United States Patent [19]

Villanueva et al.

[11] Patent Number: 4,662,547
[45] Date of Patent: May 5, 1987

[54] STEREOPHONIC AUDIO EQUIPMENT CARRIER

[75] Inventors: Xavier R. Villanueva; Sergio E. Villanueva, both of San Ysidro, Calif.

[73] Assignee: Novi, Inc., San Diego, Calif.

[21] Appl. No.: 879,844

[22] Filed: Jun. 27, 1986

Related U.S. Application Data

[63] Continuation of Ser. No. 672,936, Nov. 19, 1984, abandoned.

[51] Int. Cl.⁴ .............................................. B62J 7/00
[52] U.S. Cl. .................................... 224/30 A; 224/41
[58] Field of Search ............... 224/30 R, 30 A, 32 R, 224/36, 39, 42.42, 41; 455/345, 346

[56] References Cited

U.S. PATENT DOCUMENTS

| 479,846 | 8/1892 | Sager . | |
|---|---|---|---|
| 613,226 | 11/1898 | Adams | 224/30 A |
| 637,733 | 11/1899 | Hall | 224/30 A |
| 637,762 | 11/1899 | Buley et al. | 224/36 X |
| 652,325 | 6/1900 | McKnight . | |
| 666,088 | 1/1901 | Deitz | 224/30 A |
| 1,908,535 | 5/1933 | Pawsat . | |
| 2,109,315 | 2/1938 | Harley . | |
| 2,401,245 | 5/1946 | Hobbs | 224/36 X |
| 2,588,671 | 3/1952 | Tringali | 224/41 X |
| 3,193,232 | 7/1965 | Hatcher | 224/30 A X |
| 3,403,878 | 10/1968 | Opay . | |
| 3,598,295 | 8/1971 | Seegers | 224/41 |
| 3,947,954 | 4/1976 | Weiler . | |
| 4,176,770 | 12/1979 | Griggs et al. | 224/30 A |
| 4,280,226 | 7/1981 | Jenkins | 224/30 A X |
| 4,415,105 | 11/1983 | Jackson . | |
| 4,436,350 | 3/1984 | Jolin | 224/41 X |
| 4,440,332 | 4/1984 | Kullen . | |
| 4,445,228 | 4/1984 | Bruni | 224/30 A X |
| 4,541,555 | 9/1985 | Miree | 224/30 A X |

Primary Examiner—Stephen Marcus
Assistant Examiner—Robert M. Petrik
Attorney, Agent, or Firm—Baker, Maxham & Jester

[57] ABSTRACT

An audio equipment (radios, tape players and the like) carrier with built-in speakers. The carrier is adapted to be clamped or otherwise mounted on the handlebars of bicycles, tricycles, mopeds, motorcycles and the like. The speakers project rearward from the handlebars and are on opposite sides of a front fork control arm. The carrier has a flat top and the audio equipment is held thereon by a releaseable strap. A plug and leads provide electrical communication between the audio equipment and the 2 speakers.

20 Claims, 8 Drawing Figures

STEREOPHONIC AUDIO EQUIPMENT CARRIER

This is a continuation of copending application Ser. No. 672,936 filed on Nov. 19, 1984, now abandoned.

BACKGROUND OF THE INVENTION

This invention relates to brackets and the like (hereinafter "carriers") for releasably mounting portable radios, portable tape players, and the like (hereinafter "audio equipment") onto vehicles having a forward wheel controlled by a combination stem or fork control arm and handlebars, such as bicycles, tricycles, mopeds, motorcycles and the like.

From this point on, the specification will describe this invention as it mounts and functions on a bicycle, but the reader should be aware that it applies equally well to any of the aforementioned vehicles having a forward wheel controlled by a combination fork control arm and handlebars.

This invention used in combination with audio equipment (equipment capable of producing electric signals which can be converted to sounds audible to the ear) adapted to drive external speakers provides an operator of a bicycle with stereophonic audio entertainment without the need for earphones. Operators of bicycles have heretofore had to do without audio entertainment unless they somehow carried audio equipment on their persons and used earphones to carry the audio to their ears. Such an arrangement has heretofore been the only way an operator can properly receive stereophonic audio, since for proper reception the operator should be equi-distant from the two transducers which emit the audio. Without the earphones, stereophonic equipment should be carried in front and centered, with respect to the operator, without inconveniencing the operator and without impairing the safe operation of the bicycle.

This invention provides such a solution. By using this invention, an operator's audio equipment is positioned in front of and centered with respect to an operator, and earphones are not needed to properly receive stereophonic audio.

Such an arrangement is highly advantageous with respect to safety. In most states, the operator of a motorcycle cannot legally wear earphones because of the fact that earphones excessively attenuate ambient sounds, such as horns and sirens. Safe driving laws require that the operator of a motor vehicle be aware of ambient sounds. Unfortunately, most states do not have the same restriction concerning bicycle riders, and with the proliferation of portable, pocket size stereophonic audio equipment with earphones, a dangerous situation has arisen. There are many people, most notably children and teenagers, riding bicycles while wearing earphones. Since this invention provides stereophonic audio without the need for earphones and without attenuating ambient sounds, it provides a safer alternative than earphones.

Another significant feature of this invention is that it is adaptable. It can be used in combination with most portable radios and tape players without modification. Furthermore, the audio equipment can be easily mounted and easily removed to prevent theft of the audio equipment. When parking the bicycle, the user can simply remove and carry the audio equipment until the or she returns to the bicycle.

Another advantage of this invention is that it is affixed to a bicycle in such a way as to not cause any imbalance. It is literally symmetrical both in form and in mass, and it is mounted directly over and very close to the handlebars and stem or fork control arm of the bicycle, thus causing no longitudinal imbalance. Furthermore, this invention can be mounted virtually on all vehicles having a forward wheel controlled by a fork control arm and handle bar combination.

Other advantages and attributes of this invention will be readily discernible upon a reading of the text hereinafter.

SUMMARY OF THE INVENTION

A purpose of this invention is to provide a bicycle rider with a means for listening to stereophonic audio without the need for earphones and without attenuating ambient sounds. A further object of this invention is to provide the same advantages for operators of tricycles, mopeds, motorcycles and the like.

This invention presents an audio equipment carrier for vehicles having handlebars affixed to a fork control arm or stem. It primary comprises a main body affixed to the handlebars and centered laterally with respect to the fork control arm, a pair of speaker enclosures affixed to the main body, a pair of electric signal-to-audio transducers, each single disposed in a speaker enclosure, a releaseable means for securing in-place the audio equipment and a means for communicating electric signals from the audio equipment to the transducers. A portion of the main body is adapted to having the audio equipment mounted thereon, and preferably that portion is a generally horizontal, planar surface on the top of the main body. The audio equipment is held in-place on the planar surface by strap means which embrace the audio equipment to the carrier.

Other objects of this invention will be readily discernible upon a reading of the complete text herein.

DESCRIPTION OF THE PREFERRED EMBODIMENT

Figure 1:
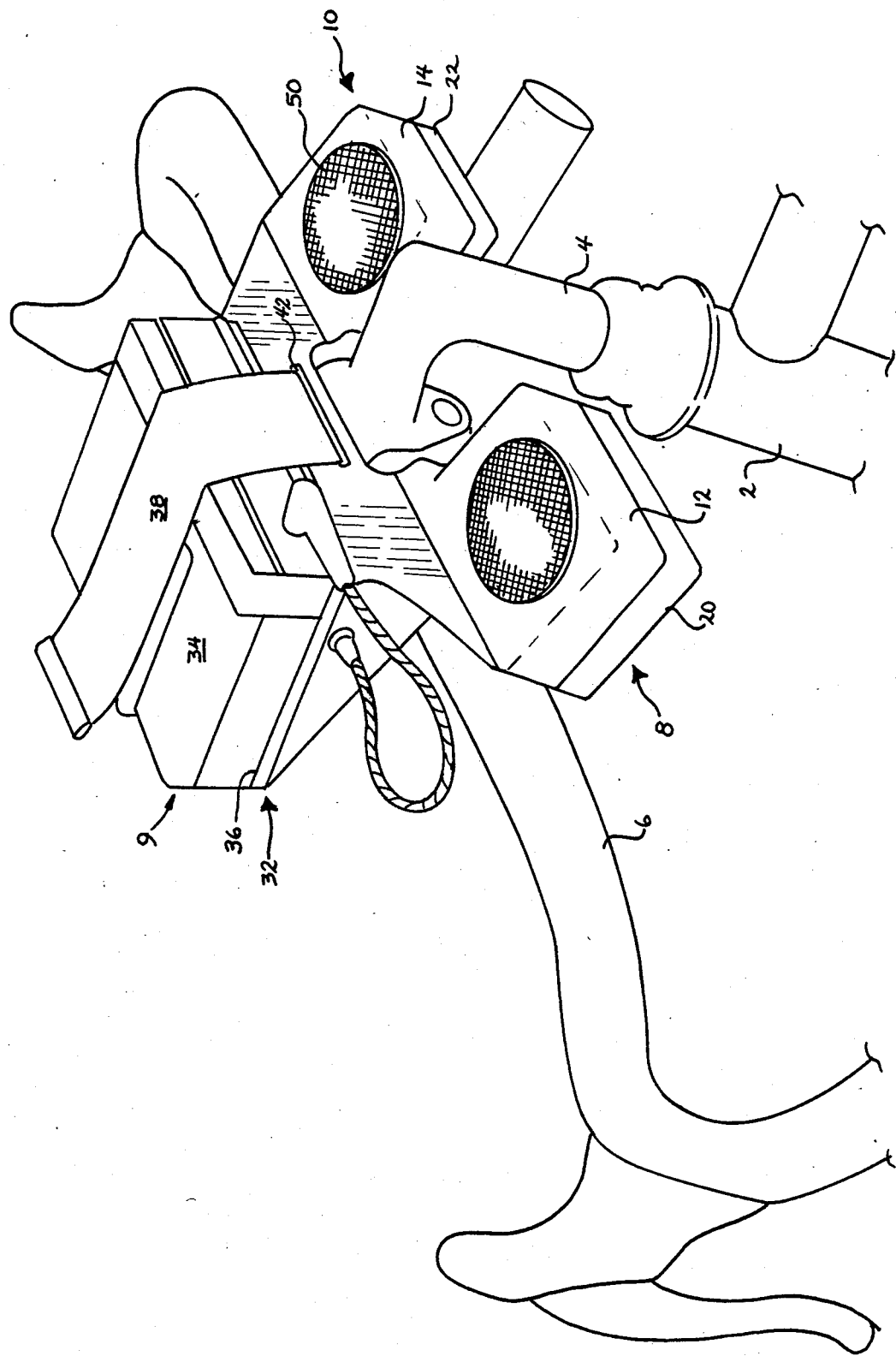
FIG. 1 is a pictorial view of the invention mounted on the handlebars of a bicycle and with audio equipment thereon.
Figure 2:
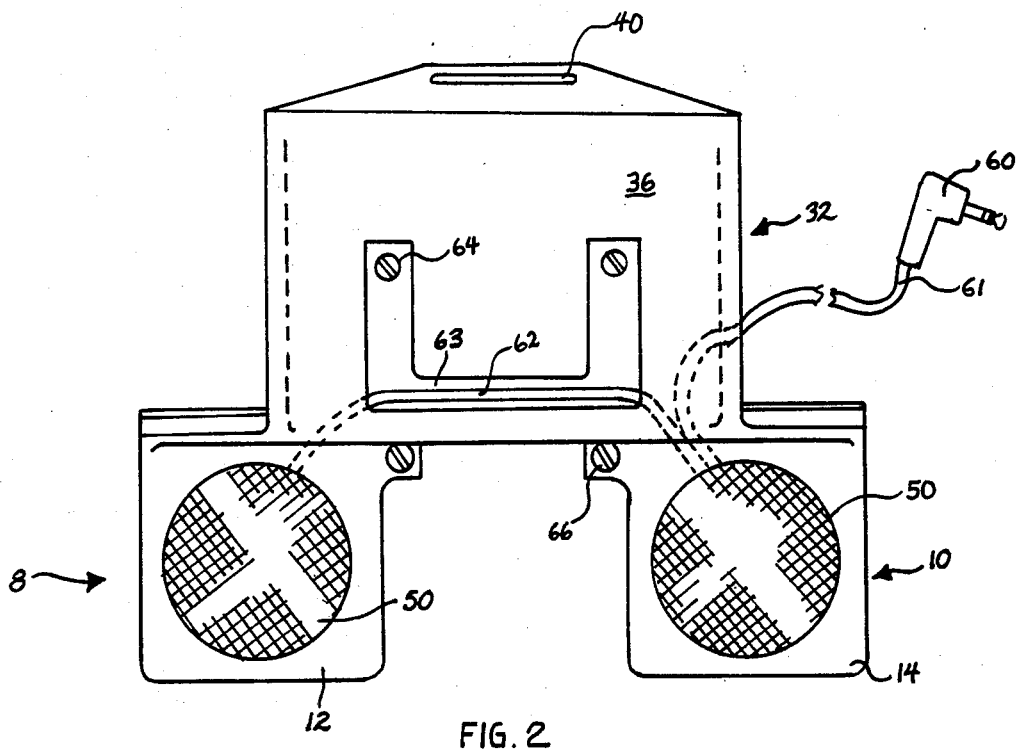
FIG. 2 is a plan view of the invention of FIG. 1 without the audio equipment.
Figure 3:
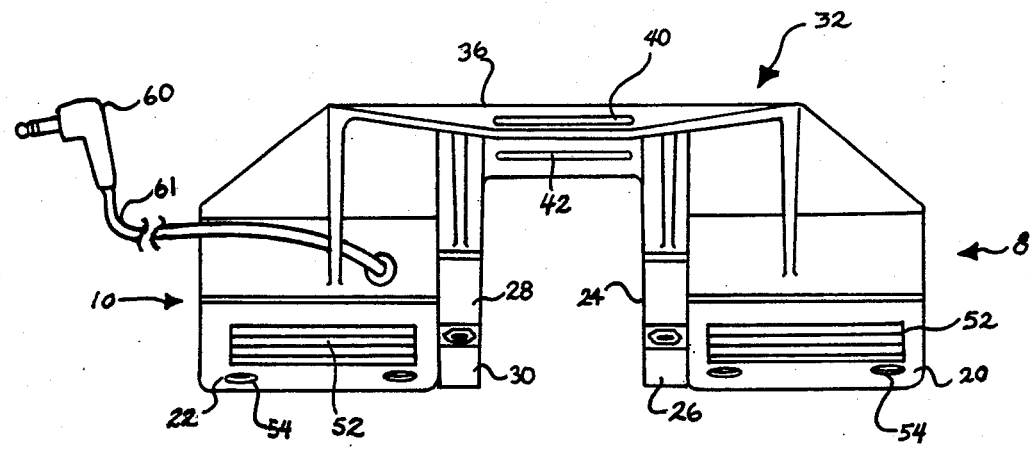
FIG. 3 is an elevation of the invention of FIG. 2 from the front.
Figure 4:
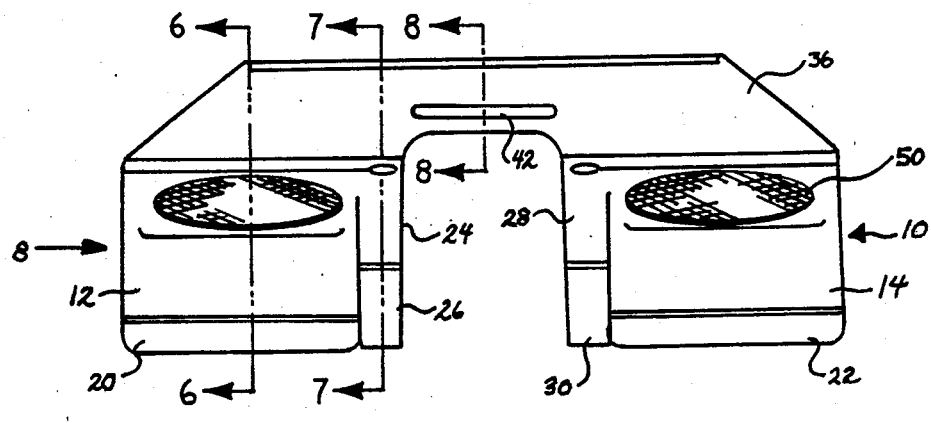
FIG. 4 is an elevation of the invention of FIG. 2 from the rear.
Figure 6:
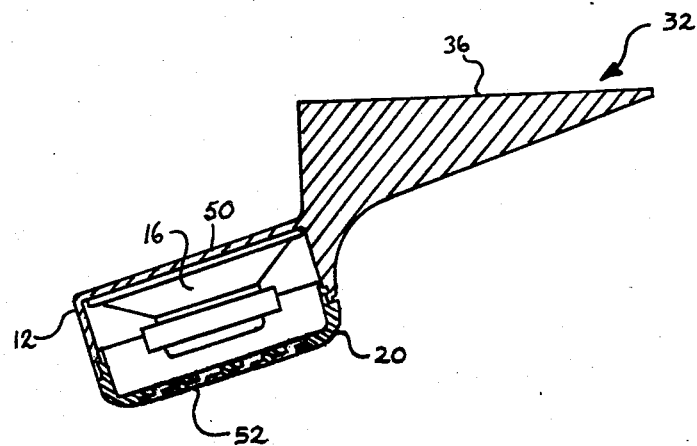
FIG. 6 is a section taken along line 6—6 of FIG. 4.
Figures 7, 8:
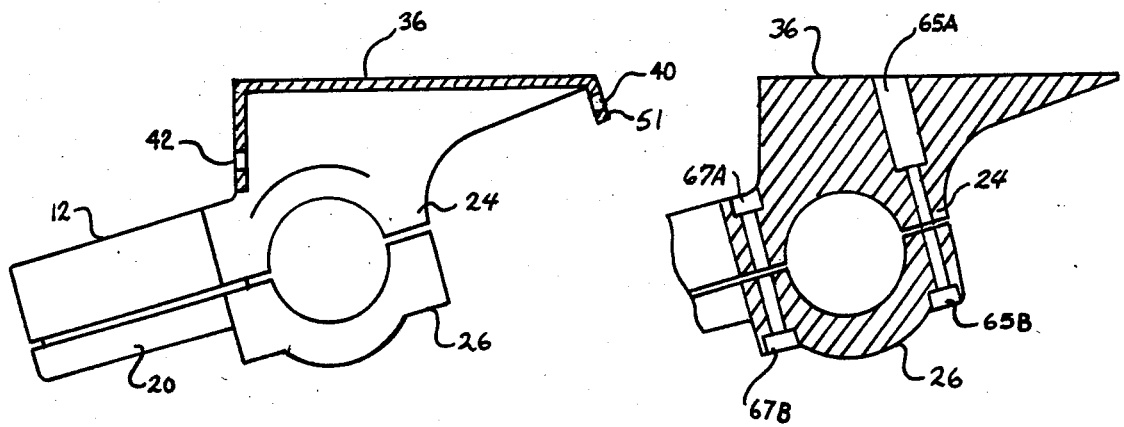
FIG. 7 is a section taken along line 7—7 of FIG. 4.
FIG. 8 is a section taken along line 8—8 of FIG. 4.

Referring to FIGS. 1 and 6, a front frame member 2 of a bicycle is shown having an upward extending "L" shaped control arm or stem 4 to which are affixed handlebars 6 in known manner. Carrier 9 of the invention is mounted on the handlebars 6 such that a left speaker 8 is on the left side of the control arm 4, with reference to the operator, and a right speaker 10 is on the right side of the control arm. The left speaker 8 generally comprises a left speaker enclosure 12 and a left transducer 16. The right speaker 10 generally comprises a right speaker enclosure 14 and a right transducer (not shown). A bottom portion 20 of the left speaker and a bottom portion 22 of the right speaker are removable for inserting and maintaining the transducers. Preferably, each transducer has its diaphragm or cone made from a plastic film such as Mylar, polypropylene, or other suitable moisture proof material. The transducers receive electric signals from the audio equipment and convert them to audible sound waves (audio).

Referring to FIGS. 3-7, the invention is affixed to the handlebars 6 by a left and a right clamp. Each clamp comprises two "C" shaped halves which form an encircling clamp when joined. The left clamp is comprised of a top half 24 and a bottom half 26. The right clamp is comprised of a top half 28 and a bottom half 30. The top halves are preferably integral with a main body 32 of the invention, as will be explained, and the bottom halves are removably secured thereto by appropriate means such as bolts.

Figure 5:
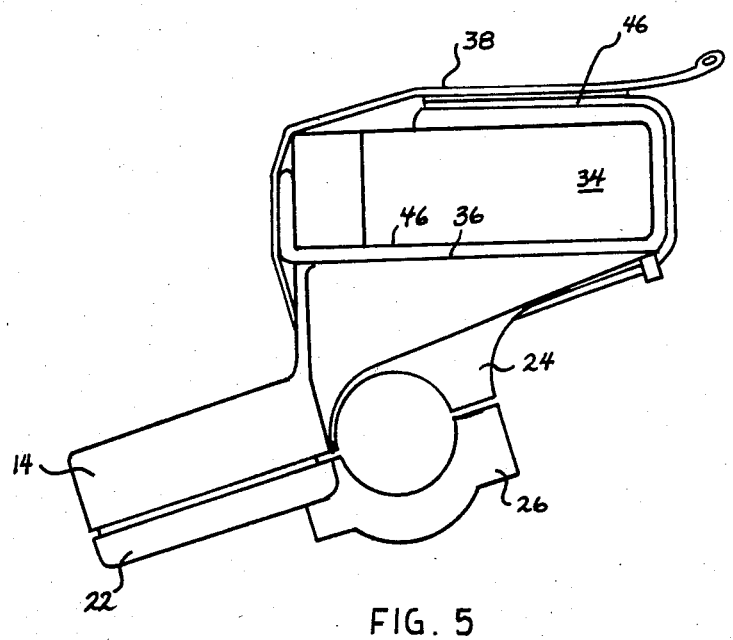
FIG. 5 is a side elevation of the invention of FIG. 1.

Referring again to the drawing, the main body of the invention is generally designated 32. FIGS. 1 and 5 show audio equipment 34 mounted on a generally horizontal, planar surface 36 of body 32 and held thereto by a strap means 38. The strap can be a single piece of cloth or belting material wrapping around surface 36 and the audio equipment, as shown, the ends being releasably joined together by conventional means, such as hook and pile fasteners. Alternatively, the strap can be two pieces, anchored to the body 32 at one end and conventionally coupled to the body at the other end by an appropriate means such as a buckle. The function of the strap is to frictionally hold the audio equipment onto and in-place on the surface 36.

Preferably the main body 32 comprises the surface 36, the top clamp halves 24 and 28 and the speaker enclosures 12 and 14, all of unitary construction. It is adapted to mount on handlebars 6 such that the surface 36 is above and extends forwardly of the handlebars, the surface being centered with respect to control arm 4 of the fork. The speakers are rearward of the handlebars and disposed on opposite sides of the fork control arm.

The planar surface 36 can be spaced somewhat above the speaker enclosures as shown in FIGS. 2-8, or it can be contiguous with, but divergent from, the speaker enclosures. In both configurations the speaker enclosures are declined from the plane of surface 36 at an angle suitable for optimum projection of the audio to an operation when surface 36 is substantially horizontal. In both configurations, a front strap slot 40 and a back strap slot 42 are formed in the main body. Preferably, the strap slots are disposed at or near opposed margins of the surface 36. As shown in the drawing, the strap slots 40 and 42 are transverse with and spaced along the longitudinal axis of the bicycle to which the carrier is adapted to be mounted.

As shown in FIGS. 1 and 5, the strap 38 extends through both strap slots, 40 and 42, passing beneath the surface 36, and is joined above the audio equipment 34. Alternately, the strap can be anchored at front strap slot 40 in tilted tab 51 and attached or secured by suitable means to back strap slot 42. In both cases the strap tightly embraces the audio equipment 34 between it and the surface 36. Optionally, there is a resilient padding 46 interposed between the audio equipment and the carrier of this invention to prevent damage to the audio equipment or possible detuning caused by vibrations.

Defined by or otherwise affixed to each of the speaker enclosures on its top side is a speaker grill or screen 50. The grills 50 protect the transducers but provide for optimum passage of audio. To remove rain water and other accumulative moisture, louvers 52 are formed in speaker enclosure bottom pieces 20 and 22. Also formed in each bottom piece may be a plurality of drain holes 54.

The transducers 16 and 18 are coupled in electrical communication with the audio equipment by means of a plug 60, a lead 61 and a second lead 62. Lead 61 contains wires for both speakers and lead 62 is simply a continuation of wires for the left speaker 8. The leads pass through the main body via suitably disposed apertures and grooves. Furthermore, lead 62 passes beneath surface 36 via one leg of a "U" shaped recess 63 defined by body 32.

The clamp bottom halves 26 and 30 are joined to their respective top halves by a plurality of bolt means 64 which pass through recessed bores 65A and 65B, and bolt means 66 which pass through recessed bores 67A and 67B.

An alternative embodiment has battery means disposed in a cavity or recess defined by the main body an adapted for the purpose of supplying power to the audio equipment. The recess shown in FIG. 2 can contain battery means for such a purpose, or spare batteries. Likewise, a main body defined recess can also be adapted to contain auxiliary audio equipment such as an amplifying means for amplifying the electric signals from the audio equipment to the speakers.

The foregoing description was given for illustrative purposes only and no unnecessary limitations in the claims appended hereto should be drawn therefrom.

We claim:

1. A carrier for coupling self-contained and powered, portable audio equipment to vehicles having handlebars affixed to a fork control arm, said carrier comprising:
   a main body including a pair of spaced-apart speaker enclosures and a horizontal planar surface;
   means for removably mounting said main body to a portion of said handlebars which is centered laterally with respect to said fork control arm and with the center of gravity closely adjacent to said handlebars;
   said pair of speaker enclosures extending rearwardly of said handlebars toward a rider on said vehicle;
   an electric signal-to-audio transducer in each said speaker enclosure;
   said horizontal planar surface extending forwardly of said handlebars away from said rider and adapted to receive the audio equipment of a variety of sizes thereon;
   means for releasably securing the audio equipment to said horizontal planar surface receiving means and
   means for communicating electric signals from the audio equipment to said transducers, said electric signals representing audio sounds and being generated by the audio equipment;
   said carrier, when the audio equipment is mounted thereto, being shaped and configured to be substantially longitudinally balanced with respect to said mounting means.

2. The carrier recited in claim 1, wherein said horizontal planar surface is defined by the top of said main body.

3. The carrier recited in claim 1, wherein said carrier is shaped and configured so that when it is mounted to a vehicle, said speaker enclosures are adapted to extend rearwardly on either side of said stem control arm.

4. The carrier recited in claim 1 or 2, wherein said releasable securing means comprises a strap means which embraces the audio equipment and at least part of said audio equipment receiving means.

5. The carrier recited in claim 1 or 2, wherein said speaker enclosures project rearwardly of said portion of said handlebars to which said carrier is mounted and are disposed on opposite sides of said fork control arm.

6. The carrier recited in claim 4, wherein said speaker enclosures project rearwardly of said portion of said handlebars to which said carrier is mounted and are disposed on opposite sides of said fork control arm.

7. The carrier recited in claim 5, wherein said speaker enclosures are declined from said horizontal planar surface for better projection of the audio to an operator.

8. The carrier recited in claim 6, wherein said speaker enclosures are declined from said horizontal planar surface for better projection of the audio to an operator.

9. The carrier recited in claim 1 or 2, wherein said main body and said speaker enclosures are of unitary construction.

10. The carrier recited in claim 4, wherein said main body and said speaker enclosures are of unitary construction.

11. The carrier recited in claim 1 or 2, and further comprising a recess formed in said main body, said recess being adapted to receive battery means.

12. The carrier recited in claim 4, and further comprising a recess formed in said main body, said recess being adapted to receive battery means.

13. The carrier recited in claim 1 or 2, and further comprising a recess formed in said main body, and auxiliary audio means disposed therein.

14. The carrier recited in claim 4, and further comprising a recess formed in said main body, and auxiliary audio means disposed therein.

15. The carrier recited in claim 4, wherein said strap means comprises an elongated element with its two ends equipped with mating hook and pile fastener means.

16. The carrier recited in claim 1, wherein said means for releasably mounting said carrier to said handlebars comprises clamp means.

17. The carrier recited in claim 16, wherein said clamp means comprises a clamp on either side of said main body adjacent each said speaker enclosure, each said clamp having a releasable portion to permit rotational and lateral adjustability with respect to said handlebars and removal of said carrier from said handlebars.

18. The carrier recited in claim 16, wherein said main body is substantially forward of said clamp means and said speaker enclosures are substantially rearward of said clamp means.

19. The carrier recited in claim 1, and further comprising a shock absorbing pad on said audio equipment receiving means adapted to receive said audio equipment thereon.

20. The carrier recited in claim 19, wherein said shock absorbing pad partially surrounds the audio equipment and is partially held in place by said releasable securing means.

* * * * *